United States Patent
Edwards (10) Patent No.: US 7,475,911 B2
(45) Date of Patent: Jan. 13, 2009

(54) SPLASHGUARD

(75) Inventor: Jerry Edwards, Portland, OR (US)

(73) Assignee: Roadmaster, Inc., Portland, OR (US)

( * ) Notice: Subject to any disclaimer, the term of this patent is extended or adjusted under 35 U.S.C. 154(b) by 180 days.

(21) Appl. No.: 11/290,240

(22) Filed: Nov. 29, 2005

(65) Prior Publication Data

US 2006/0103129 A1   May 18, 2006

Related U.S. Application Data

(63) Continuation-in-part of application No. 10/440,350, filed on May 16, 2003, now abandoned.

(60) Provisional application No. 60/416,081, filed on Oct. 3, 2002.

(51) Int. Cl.
*B62D 25/16* (2006.01)

(52) U.S. Cl. .................... 280/851; 280/153.5; 280/154

(58) Field of Classification Search .............. 280/847, 280/152.3, 848, 153.5, 154, 851; 293/112; D12/184, 185
See application file for complete search history.

(56) References Cited

U.S. PATENT DOCUMENTS

| | | | | |
|---|---|---|---|---|
| 2,809,848 A * | 10/1957 | Carswell | ...................... | 280/851 |
| 2,826,428 A * | 3/1958 | Lincoln | ...................... | 280/851 |
| D192,684 S * | 5/1962 | Knowles | ...................... | D12/185 |
| 3,091,478 A * | 5/1963 | Ambli | ...................... | 280/851 |
| 3,195,920 A * | 7/1965 | Knisely et al. | ...................... | 280/851 |
| 3,333,868 A * | 8/1967 | Sogoian | ...................... | 280/851 |
| D209,044 S * | 10/1967 | Podall | ...................... | D12/185 |
| 3,726,544 A * | 4/1973 | Miller | ...................... | 280/851 |
| 3,778,086 A * | 12/1973 | Moore et al. | ...................... | 280/851 |
| 3,799,580 A * | 3/1974 | McGuire | ...................... | 280/851 |
| 3,877,722 A * | 4/1975 | Conner | ...................... | 280/154 |
| 4,103,918 A * | 8/1978 | Salden | ...................... | 280/851 |
| 4,453,728 A * | 6/1984 | Verge | ...................... | 280/851 |
| 4,505,010 A * | 3/1985 | Arenhold | ...................... | 24/456 |
| 4,695,070 A * | 9/1987 | Knox | ...................... | 280/851 |
| 4,928,993 A * | 5/1990 | Appavoo | ...................... | 280/851 |
| 4,966,378 A * | 10/1990 | Cook | ...................... | 280/154 |
| 5,121,944 A * | 6/1992 | Haddox | ...................... | 280/848 |
| 5,833,254 A * | 11/1998 | Bucho | ...................... | 280/154 |
| D417,422 S * | 12/1999 | Rogers | ...................... | D12/185 |
| 6,076,842 A * | 6/2000 | Knoer | ...................... | 280/154 |
| 6,179,311 B1 * | 1/2001 | Larkin et al. | ...................... | 280/154 |
| 6,394,475 B1 * | 5/2002 | Simon | ...................... | 280/154 |
| 6,485,059 B2 * | 11/2002 | Burnstein | ...................... | 280/851 |
| 7,213,843 B2 * | 5/2007 | Edwards | ...................... | 280/851 |
| 2005/0146129 A1 * | 7/2005 | Andrews | ...................... | 280/851 |
| 2006/0284408 A1 * | 12/2006 | Edwards | ...................... | 280/851 |

* cited by examiner

*Primary Examiner*—Jeffrey J Restifo
(74) *Attorney, Agent, or Firm*—Ian F. Burns & Associates, P.C.

(57) ABSTRACT

A splashguard for use in controlling tire splashes of a vehicle is disclosed. The splashguard includes a first plate that is attachable to a vehicle where the first plate has a top and bottom, and a second plate is attached to the bottom of the first plate. The splashguard includes an adjustably-spaced aperture and is configured so that when a surface being traveled on by the vehicle changes surface level, the second plate pivots relative to the first plate to adjust height of the splashguard. The splashguard may include a fastening mechanism that involves a strap and hanger arrangement. The splashguard may further include a removable portion configured to accommodate at least one vehicle component protruding from the rear side of the vehicle, such as a muffler or a trailer hitch receiver.

13 Claims, 11 Drawing Sheets

SPLASHGUARD

CROSS REFERENCE TO RELATED PATENT APPLICATIONS

This application is a continuation-in-part application of U.S. patent application Ser. No. 10/440,350, filed on May 16, 2003 now abandoned. This application also claims priority of U.S. provisional application Ser. No. 60/416,081, filed on Oct. 3, 2002. The above referenced applications are hereby expressly incorporated by reference in their entireties.

BACKGROUND OF THE INVENTION

The present invention relates to splashguards used to prevent objects, such as water, mud, rocks, sand and debris, that may be scattered from a vehicle's tires from impacting other objects, such as windshields of following vehicles. In particular, splashguards of the present invention provide for enhanced flexibility of the splashguard in adjusting to changes in roadway levels.

As a vehicle travels down a road, the vehicle's tires may scatter or disperse water, mud, rocks, sand, debris and other objects. The faster the vehicle is moving, the faster these objects may be scattered. If these objects impact other vehicles or people, they can cause a significant amount of damage and inconvenience. Therefore, devices have been developed to prevent vehicle tires from scattering objects beyond a vehicle.

Some vehicle owners use splashguards to prevent tire splashes from muddying their vehicles. Typical splashguards cover one wheel on one side of a vehicle. Thus, most vehicles have a pair of splashguards to cover both rear wheels. Examples of these splashguards include those disclosed in Larkin et al. (U.S. Pat. No. 6,179,311), Knoer (U.S. Pat. No. 6,076,842), Burnstein (U.S. application Ser. No. 09/792,713), and Simon (U.S. Pat. No. 6,394,475). Some trucks may have four rear wheels, so they may have four splashguards, such as the splashguards disclosed in Conner (U.S. Pat. No. 3,877,722). The splashguards discussed above are positioned perpendicular to the vehicle's undercarriage, and they define a partial surface between the undercarriage and the road. These splashguards are further positioned adjacent to a tire to cover the front of the tire so that when the tire rotates on moving road elements, such as water, mud or dirt (hereinafter referred to as "tire splash"), the splashguards prevent tire splashes from moving, dirtying or damaging objects, such as vehicle portions adjacent to the tire or windshields of following vehicles.

One problem with these known splashguards is that they allow some tire splash to escape, particularly through the area between the vehicle's left and right tires. It is desired that splashguards cover this area.

Splashguards disclosed in Knowles (U.S. Design Patent Des. 192,684) and Podall (Des. 209,044) appear to be made of rectangular material that extends throughout the rear side of the vehicle. While these splashguards appear to be able to control tire splashes being dispersed from the area between the vehicle's tires, they are unable to control tire splashes being dispersed from the area between the road and the bottom edge of the splashguard. It is desired that splashguards cover both the area between the road and the edge of the splashguard and the area between the vehicle's tires.

Splashguards disclosed in Larkin et al. (U.S. Pat. No. 6,179,311), Knoer (U.S. Pat. No. 6,076,842), Burnstein (U.S. application Ser. No. 09/792,713), Simon (U.S. Pat. No. 6,394,475) further appear to be rigidly mounted to a bar. The splashguard disclosed in Rogers (U.S. Design Patent Des. 417,422) appears to be rigidly mounted to a vehicle's bumper. Another problem with these splashguards is that when the surface level of the road the vehicle travels on changes, the splashguards are susceptible to being damaged. When the road level changes, the splashguards may hit the road, and either the splashguards will eventually be detached from their attachment points, or they will physically be damaged due to the impact with the road. It is desirable to add flexibility to these splashguards to allow them to accommodate changing road levels thereby minimizing their exposure to potentially damaging impact.

Another problem with known splashguards described above is that they do not have a way of accommodating vehicle components that protrude from the rear side of vehicles, such as mufflers and towing hitches. It is further desired that the splashguards have a way of accommodating these protruding components, which may vary in their placements relative to the rear sides between various vehicle types.

BRIEF SUMMARY OF THE INVENTION

The present invention provides a splashguard for use in controlling tire splashes of a vehicle, the splashguard comprising (a) a first plate attachable to a vehicle, the first plate being configured to substantially control tire splashes from the vehicle's tire; (b) a second plate hingably attached to the first plate, wherein when a surface being traveled on by the vehicle changes surface level, the second plate pivots relative to the first plate to adjust height of the splashguard; and (c) a fastening mechanism connected between the second plate and the first plate, wherein the fastening mechanism (i) hingably attaches the second plate to the first plate forming an adjustably-spaced aperture between the first plate and the second plate, and (ii) allows translational and rotational motion between the first and second plates.

The present invention further provides a splashguard as described above where the fastening mechanism comprises (a) a strap configured to be attached to the second plate; and (b) a hanger configured to be attached to the first plate, the hanger being shaped to receive the strap, the hanger being configured to carry the strap and the second plate, the strap being moveably attached to the hanger.

The present invention also provides a method for controlling vehicle tire splashes comprising, but necessarily in order shown: (a) providing a first and second plate; (b) providing a hinge assembly; (c) hingably attaching the second plate to the first plate using the hinge assembly; (d) providing an adjustably-spaced aperture between the first plate and the second plate, wherein the hinge assembly, the second plate and the first plate form a splashguard assembly configured to be attached to a vehicle; and (e) attaching the splashguard assembly to the vehicle. The method may further include: (a) providing a strap, the strap having at least two ends; (b) providing a hanger, the hanger being configured to receive the strap; (c) hanging a strap portion on the hanger; and (d) attaching at least one end of the strap to the second plate.

The present invention further provides for a splashguard where the first plate typically includes at least one removable portion. The removable portions (for example, first and second removable portions) may be configured to accommodate at least one vehicle component protruding from the rear side of the vehicle, that is, shaped to create an opening for a vehicle component, such as a muffler or a trailer hitch receiver.

The splashguard may further include at least one brace member attached to the first plate that is configured to support or reinforce the first plate. In another embodiment, the present invention provides a splashguard where the first plate and the second plate are substantially as wide as the distance between the vehicle's rear tires.

Among the advantages of the present invention are the following: (i) controlling tire splashes better than conventional splashguards, (ii) the ability to substantially cover the area between the vehicle's bumper and the road, (iii) the ability to substantially cover the area between the vehicle's bumper and the road, while at the same time, being able to adjust the area being covered depending on the road level, (iv) provide a durable splashguard, (v) provide a splashguard with a flexible range of motion, (vi) provide an aesthetically appealing splashguard, (vi) provide a splashguard that accommodates vehicle components that protrude from the rear side of the vehicle, (vii) provide a splashguard that accommodates vehicle components that protrude from the rear side of the vehicle, regardless of the type of vehicle, (viii) the ability to allow users to customize their splashguard; and (ix) provide a splashguard for use with various vehicle engine types.

These and other advantages may be realized by reference to the remaining portions of the specification, claims, and abstract.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one typical embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Typical embodiments of the present invention are shown in the drawings, wherein.

DETAILED DESCRIPTION OF THE INVENTION

In the following detailed description of typical embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
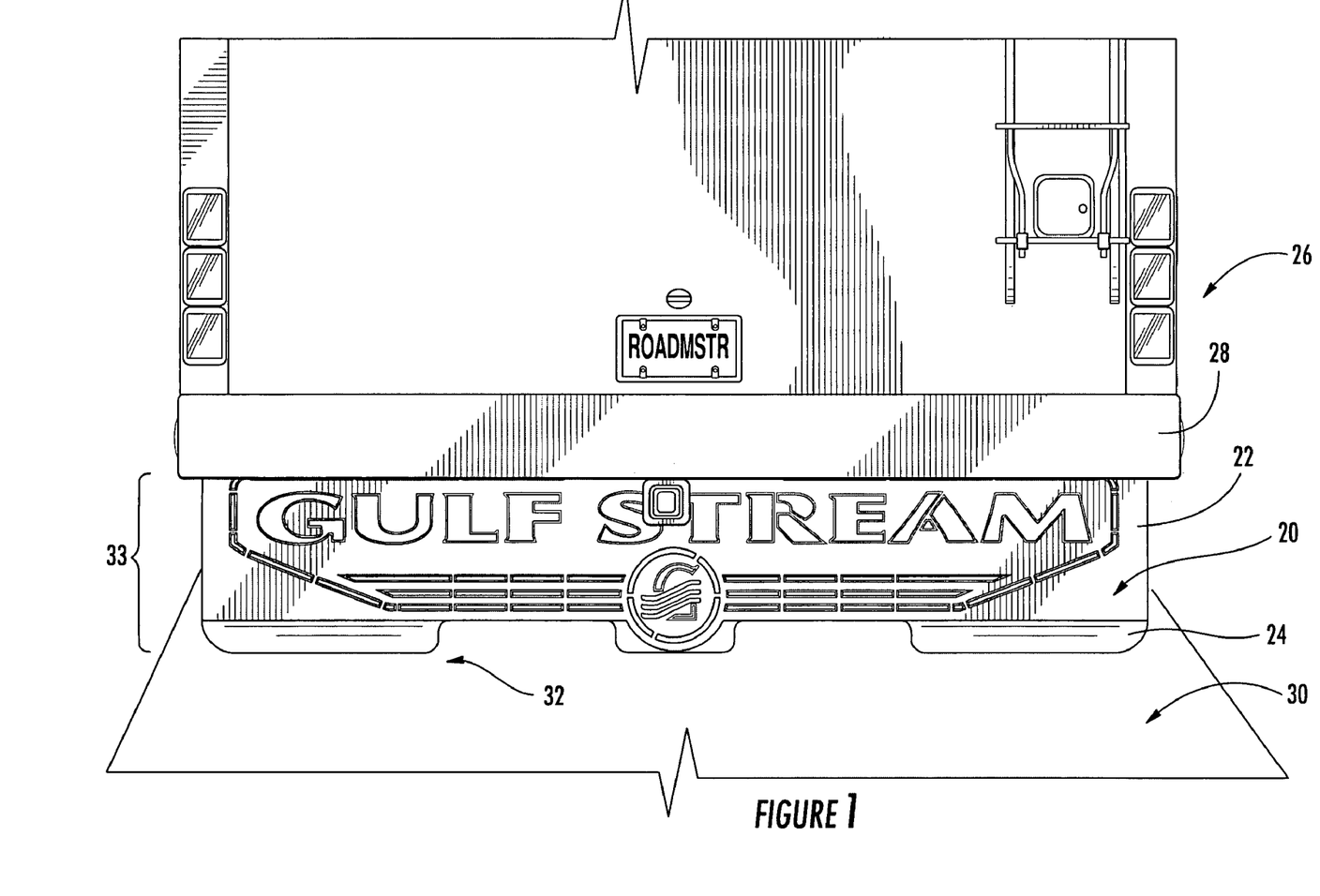
FIG. 1 is substantially a front view of an embodiment of the splashguard of the present invention.

The present invention comprises a splashguard, generally indicated by reference number 20. Referring to FIG. 1, splashguard 20 has a top plate 22. As used herein, the term "plate" generally refers to a substantially flat piece of material. Top plate 22 typically has a width that is substantially as wide as the width of a vehicle 26. Alternatively, top plate 22 may be wide enough to cover rear wheels (not shown) of vehicle 26. Top plate 22 is typically made of 14-gauge stainless steel. Top plate 22 may of course be made of other materials known in the art, such as rubber.

A bottom plate 24 typically is positioned directly underneath top plate 22 and coupled to top plate 22. In one embodiment, bottom plate 24 has a width that is substantially as wide as top plate 22. When attached together, top plate 22 and bottom plate 24 may form a substantially rectangular shape with a long axis being substantially horizontal (longitudinal) and the short axis (lateral) being substantially vertical. Bottom plate 24 may have a substantially straight lower edge (not shown), or the lower edge may have a variety of curves and fluctuations, an example of which is shown in FIG. 1. Of course, the shapes and dimensions of top plate 22 and bottom plate 24 may vary. This specification uses spatially orienting terms such as top, bottom, front, back, rearward, horizontal, etc. It is to be understood these types of terms are for ease of description of various components with respect to one another and do not define absolute orientations in space.

Splashguard 20 typically has a height that allows splashguard 20 to substantially cover an area 33 between a vehicle bumper 28 and a road 30. Splashguard 20 typically leaves a gap 32 between bottom plate 24 and road 30 to keep splashguard 20 away from constant contact with road 30.

Figure 2:
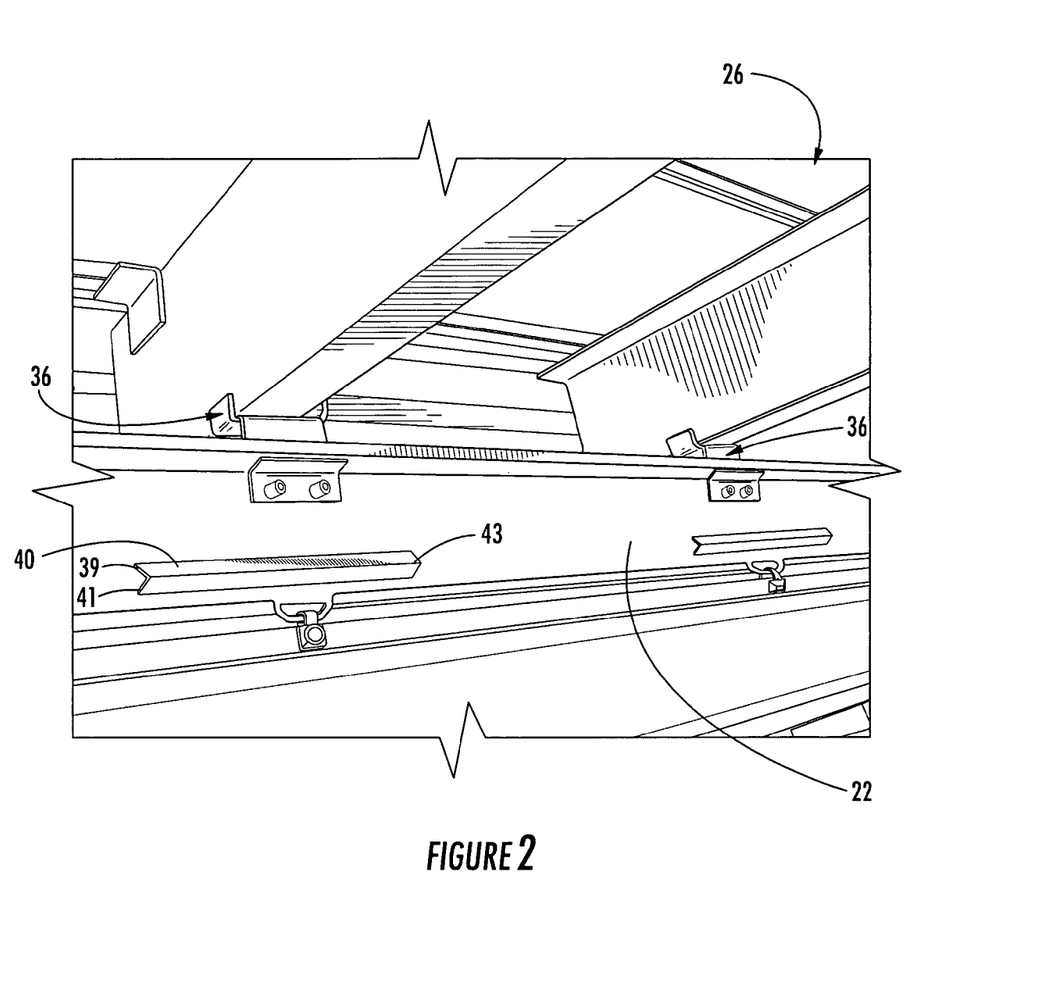
FIG. 2 is substantially a partial rear isometric view of another embodiment of a splashguard of the present invention.

Referring now to FIG. 2, top plate 22 may be attached to an undercarriage or chassis of vehicle 26 using fasteners 36. Top plate 22 may have at least one brace member 40 configured to reinforce top plate 22. Brace member 40 typically is made of steel. The structure of brace member 40 provides structural integrity to top plate 22. For example, in embodiments wherein top plate 22 is made of flexible material, such as 14-gauge stainless steel, rubber or aluminum, brace member 40 is configured to help prevent the stainless steel, rubber or aluminum from deforming. Brace member 40 typically is v-shaped having two ends 39 and 41 and an edge 43. Two ends 39 and 41 of brace member 40 typically are attached on top plate 22, and edge 43 typically protrudes from top plate 22. The number, shapes, orientation, and positions of brace member 40 relative to top plate 22 may vary.

Figure 3:
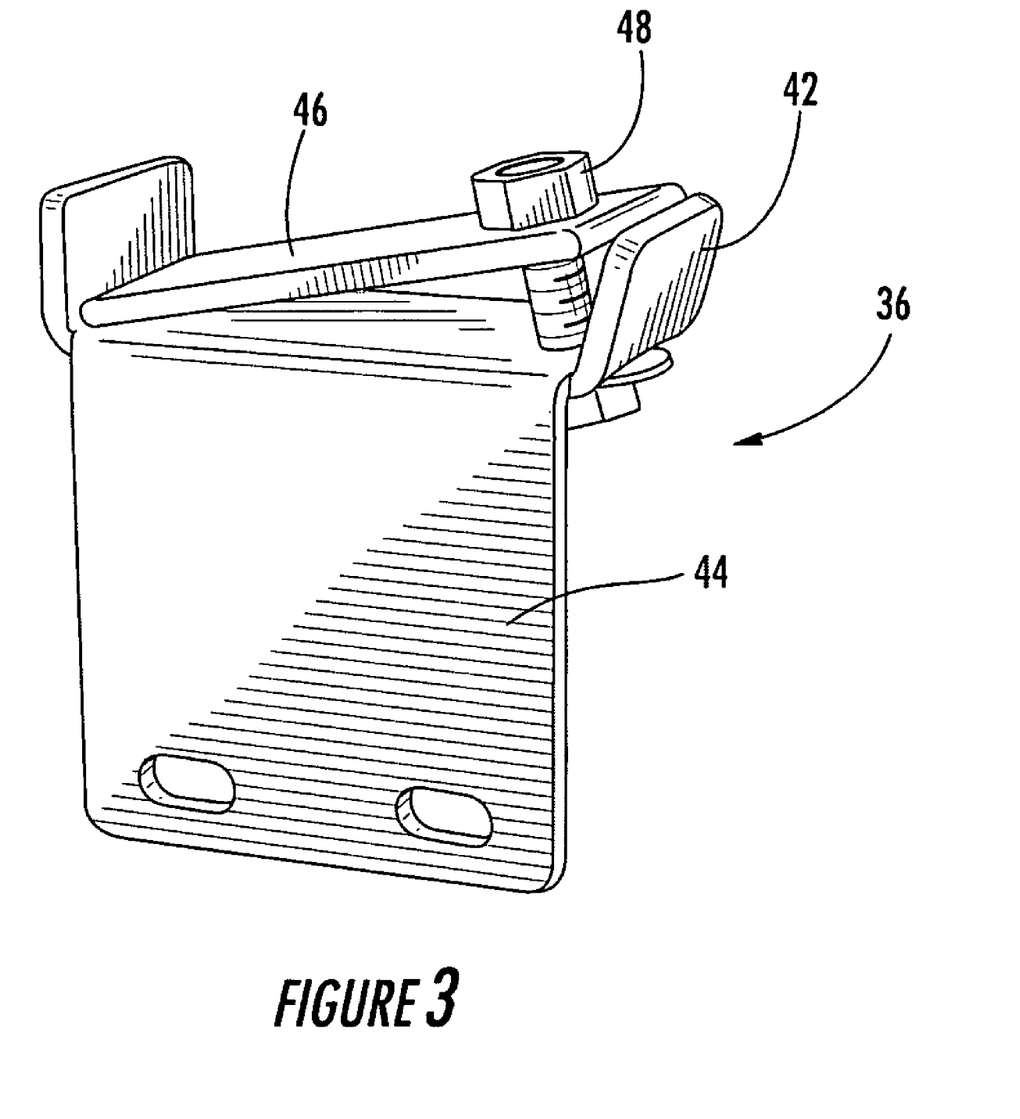
FIG. 3 is substantially a perspective view of an embodiment of a top plate fastener of the present invention.
Figure 4:
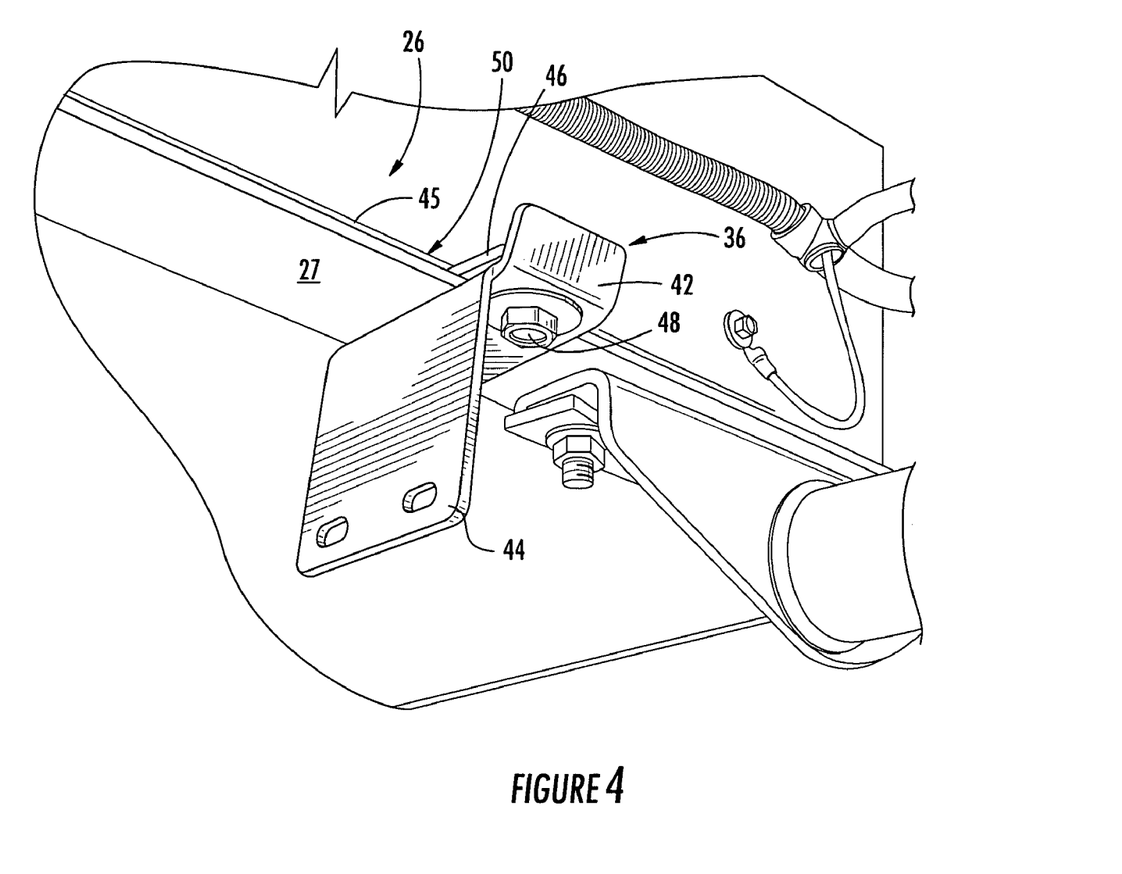
FIG. 4 is substantially a perspective view of the top plate fastener of FIG. 3 attached to a chassis of a vehicle.

Referring now to FIG. 3, an embodiment of fastener 36 typically has a U-shaped hooking member 42 and a mounting member 44 attached to hooking member 42. Fastener 36 typically has a locking plate 46 and at least one bolt 48 for securing hooking member 42 to undercarriage of vehicle 26 (not shown). Referring now to FIG. 4, fastener 36 typically is used when an attachment point on the undercarriage of vehicle 26, such as attachment point 50, defines a gap 45 between vehicle 26 and a vehicle chassis 27, which can accommodate locking plate 46. Hooking member 42 may be positioned on the bottom of attachment point 50. Locking plate 46 may be inserted through gap 45 and positioned on top of attachment point 50. Bolt 48 may secure hooking member 42 and locking plate 46 together.

Figure 5:
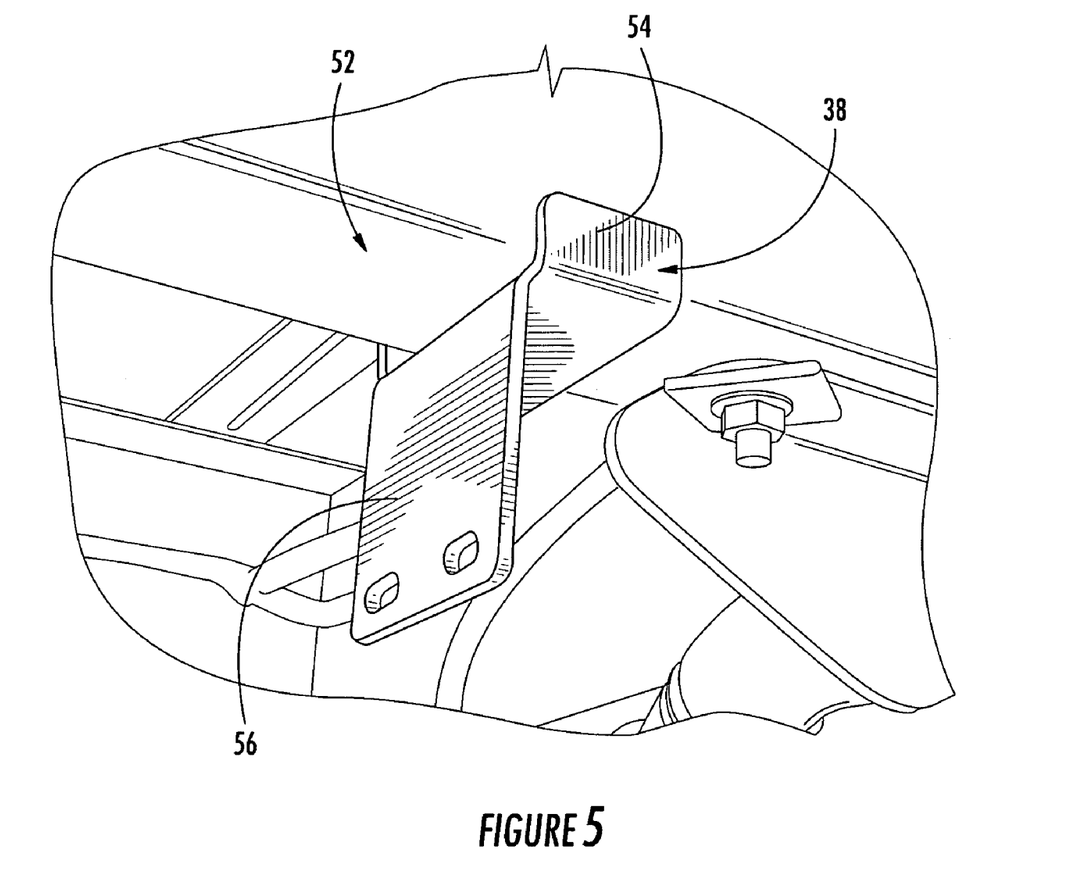
FIG. 5 is substantially a perspective view of another embodiment of a top plate fastener attached to a chassis of a vehicle.

Some attachment points in certain vehicles do not have gap 45 in between a chassis and a portion of the vehicle's body to accommodate locking plate 46 of fastener 36, such as attachment point 52 shown in FIG. 5. For these vehicles, another embodiment of a fastener, fastener 38, may be used. Fastener 38 may have a U-shaped grasping member 54 that typically is made of semi-flexible metal, such as a thin steel plate e.g. a quarter of an inch in thickness. Grasping member 54 may expand when being attached to attachment point 52 and contract upon attachment to provide grasping member 54 a friction fit relative to attachment point 52. Fastener 38 may further have a mounting member 56 attached perpendicular to grasping member 54. Mounting member 56 is adapted to mount top plate 22 (not shown) to the undercarriage or chassis of a vehicle.

Figure 6:
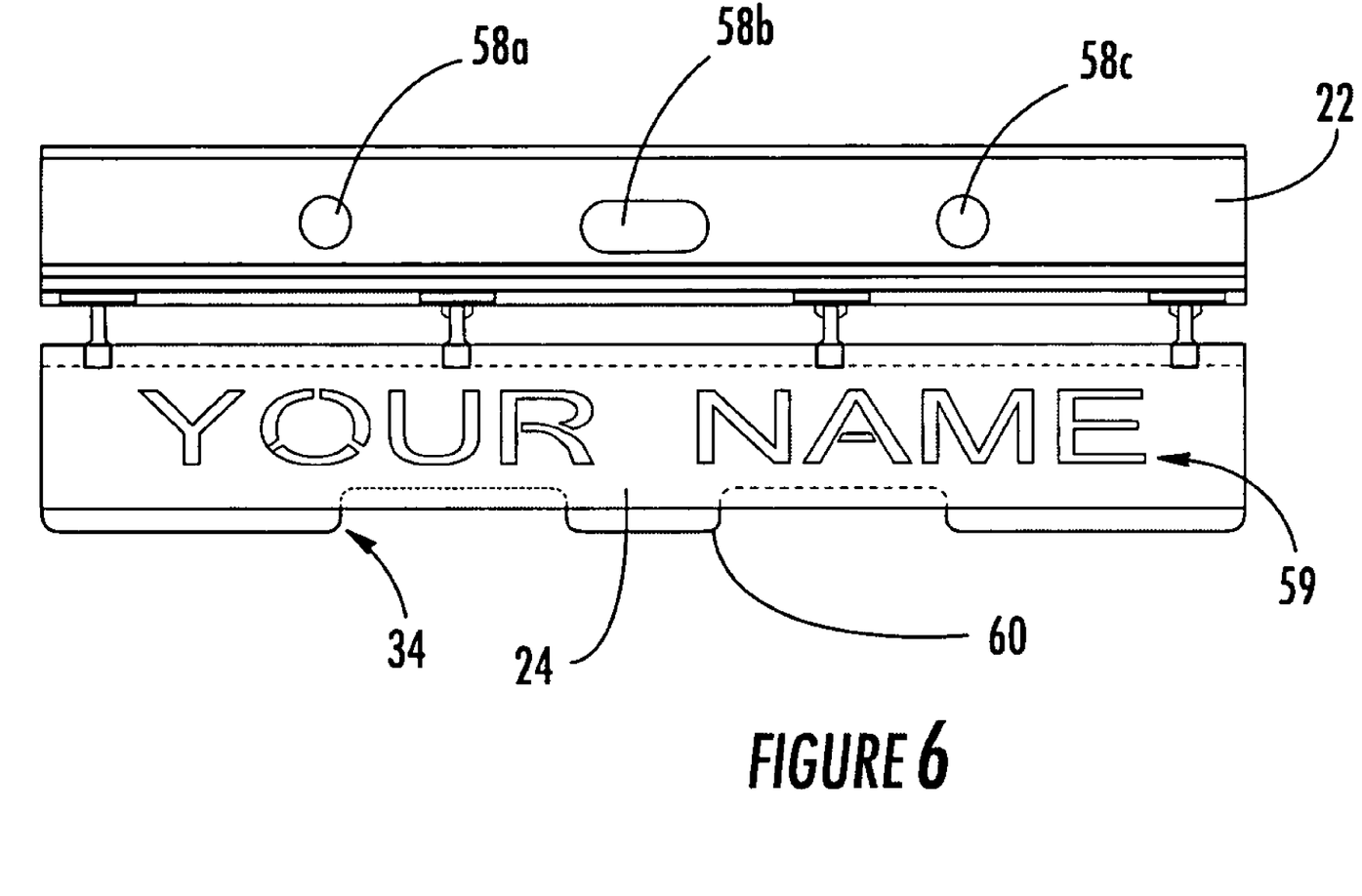
FIG. 6 is substantially a front view of another embodiment of the splashguard of the present invention.

Referring now to FIG. 6, top plate 22 typically defines at least one removable portion 58a, 58b, and 58c, which may or may not be removed. In a typical embodiment, removable portions 58a and 58c are provided and may be removed to accommodate two mufflers of vehicle 26 (not shown) so that top plate 22 does not block muffler openings. Removable portion 58b may be provided and may be removed to accommodate a trailer hitch receiver (not shown). Removable portions 58a, 58b, and 58c may be made by perforations on top plate 22 or other methods known in the art. Removable portions 58a, 58b, and 58c may be configured to accommodate any vehicle component protruding from the plane defined by the rear side of the vehicle, such as trail hitch receivers and mufflers, so that removable portions 58a, 58b, and 58c may allow top plate 22 to define a flat vertical splashguard surface parallel with the vertical plane.

With continued reference to FIG. 6, bottom plate 24 may be attached to top plate 22. A symbol 59 may be engraved, typically by laser, on bottom plate 24. Symbol 58 may be a name, a mark, a logo, designs, and the like. Bottom plate 24 typically is made of opaque material 60 positioned in between steel. Opaque material 60 typically is a rubber and polymer mixture. Of course, opaque material 60 may be made of materials known in the art, such as plain rubber. Opaque material 60 typically is in between steel materials to make symbol 58 that is engraved on bottom plate 24 more visible. Additionally, opaque material 60 typically is vertically longer than steel so that when splashguard 20 contacts the road, the more flexible and durable opaque material 60 contacts the road first. Opaque material 60 may be attached to steel materials using bolts, rivets, or other fasteners known in the art. Opaque material 60 may be purchased from RB Rubber Products of McMinnville, Oreg. 97128. Opaque material 60 may have curves 34 for aesthetic purposes. Partially opaque material may be substituted for opaque material.

Figure 7:
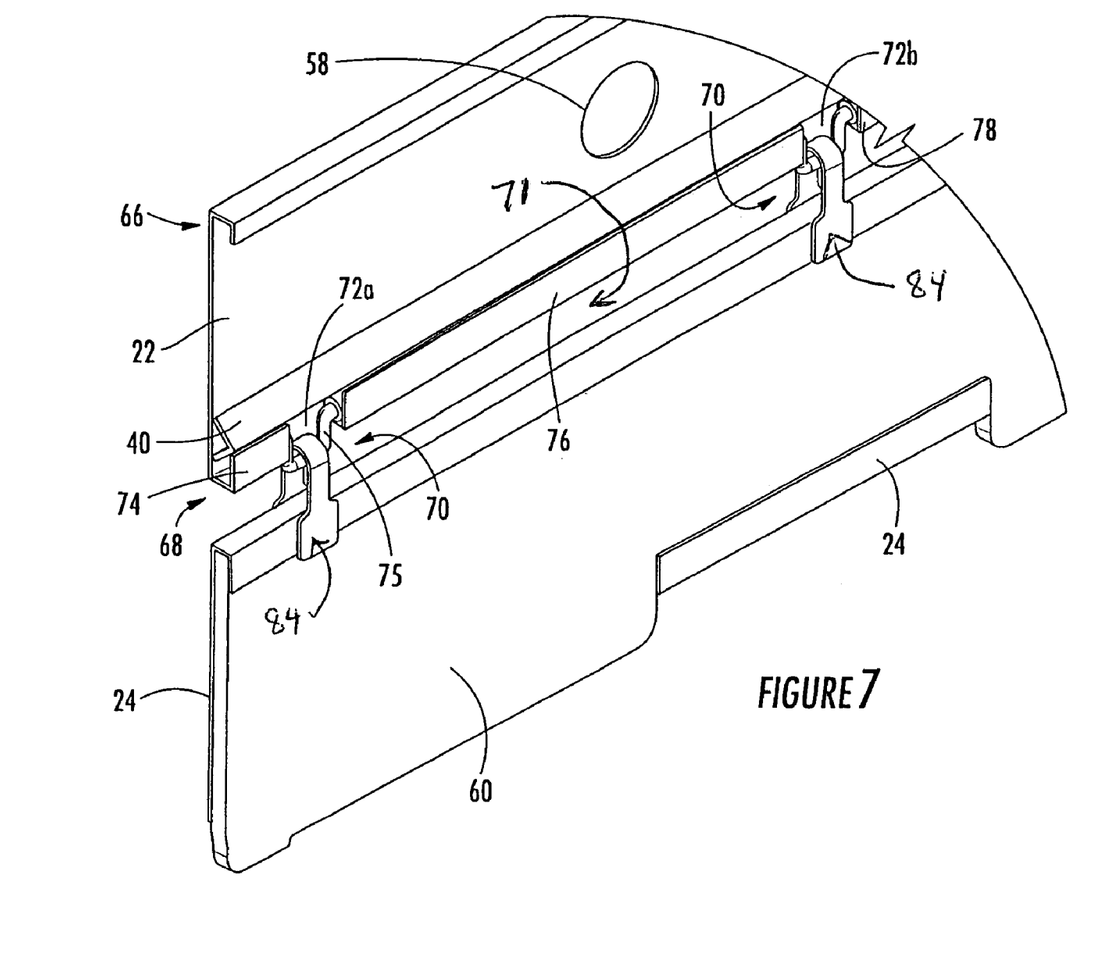
FIG. 7 is substantially a partial isometric view of the splashguard of FIG. 6 showing in detail the fastening mechanism of the splashguard.

Referring now to FIG. 7, top plate 22 may be made of a flat piece of material, typically metal, which typically has horizontal edges that have L-shaped extensions 66 and 68. Extension 66 typically is positioned on the top horizontal edge of top plate 22. Extension 68 is typically positioned on the bottom horizontal edge of top plate 22, beneath brace member 40, and adjacent to bottom plate 24. L-shaped extensions 66 and 68 typically have dimensions that extend throughout both top and bottom horizontal edges of top plate 22. Each of L-shaped extensions 66 and 68 typically has a first portion that is perpendicular to top plate 22 and a second portion that is parallel to top plate 22. Extensions 66 and 68 may vary in shape, such as a U-shape or a V-shape. Extension 68 typically comprises a plurality of sections 74, 76, and 78 that are separated by gaps 72a and 72b, which accommodate fastening mechanism 70.

An adjustably-spaced aperture 71 is formed between top plate 22 and bottom plate 24. The fastening mechanism is configured to allow both rotational (pivot-like) and translational (up and down) movement of the splashguard. For example, rotational movement allows bottom plate 24 to swing back and forth relative to plate 22, thereby permitting the splashguard to move out of the way of changes in the roadway level. The adjustable spacing feature (aperture 71) allows for a second type of motion (in addition to rotational motion) to occur during operation of the splashguard, that is, translational or up-and-down (vertical) motion. If aperture 71 corresponded to a fixed-type spacing, rather than an adjustable-type spacing, then no additional up-and-down translational motion would be possible during the operation of splashguard 20.

Figure 8:
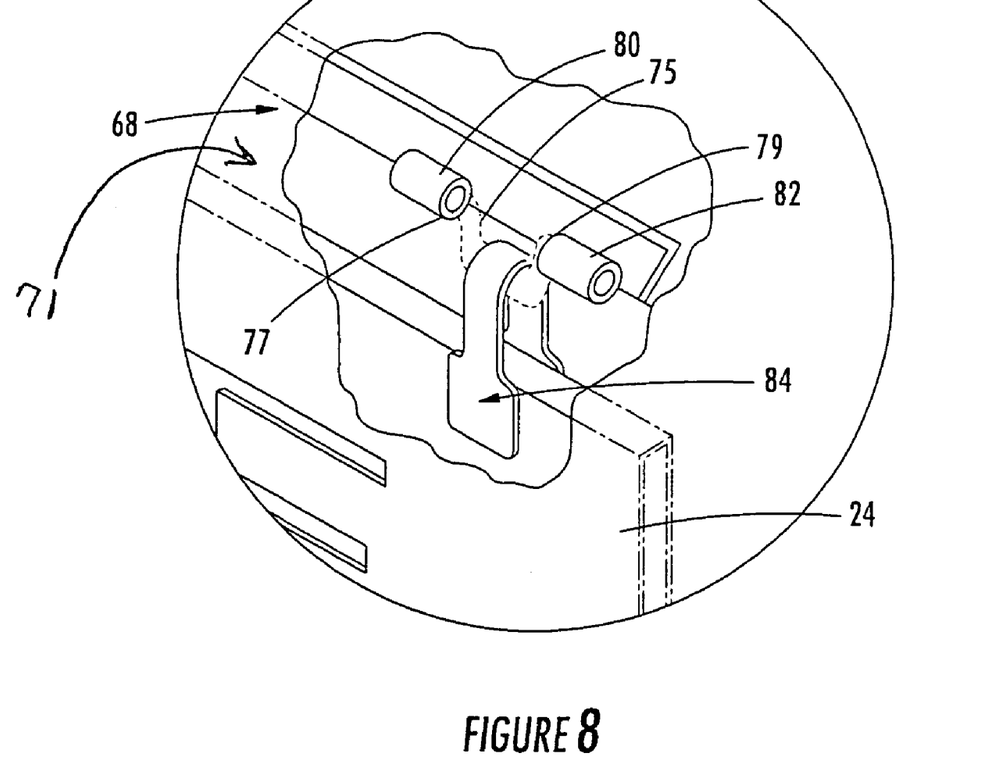
FIG. 8 is substantially a partial cross-section view of splashguard comprising a bottom plate attached to a first plate by a frame mechanism.

In one embodiment, the fastening mechanism or attachment means (for the two plates) involves a strap and hanger arrangement suited for providing the adjustable spacing feature described above. For example, the adjustably-spaced aperture 71 shown in FIGS. 7 and 8 is able to change its vertical spacing to accommodate road level changes because of the gaps 72a and 72b (see FIG. 7) formed as part of the strap 84 and hanger 75 arrangement. Gaps 72a and 72b allow for the strap to move slightly upward in the fastening mechanism when the bottom of plate 24 contacts the road level, thus producing an effective shortening of the adjustably-spaced aperture 71. Thus, the range of splashguard function is enhanced by the adjustable spacing feature (aperture 71).

Fastening mechanism 70 typically hingably attaches bottom plate 24 to top plate 22. Fastening mechanism 70 may have a hanger 75. Referring now to FIG. 8, hanger 75 typically is U-shaped and has arms 77 and 79 on each side. Arms 77 and 79 of hanger 75 may be attached to corresponding bushings 80 and 82, which are mounted on extension 68 of top plate 22. Hanger 75 may receive a strap 84 attached to bottom plate 24 so that bottom plate 24 is suspended on hanger 75 and is partially rotatable around hanger 75. Other shapes for hanger 75 may be used so long as hanger 75 receives strap 84 and allows strap 84 to at least partially rotate and to move upwards relative to the hanger portion supporting the strap. Gaps 72a and 72b (shown in FIG. 7) allow additional translational movement of the splashguard. Hanger 75, bushing 80, and strap 84 may be made of materials known in the art, such as metal.

It is noted that with fastening mechanism 70, the effective height of splashguard 20 is flexible to changing road levels, as bottom plate 24 may swing forward and backward as well as up and down, thereby adjusting the height of splashguard 20 relative to the road level. The height of splashguard 20 is generally defined by top plate 22 and bottom plate 24. In a typical embodiment, the height of splashguard 20 allows a gap (not shown) in between splashguard 20 and the road. When the road level increases and closes the gap, the road will contact bottom plate 24 and will set bottom plate 24 in motion to partially rotate at an angle relative to top plate 22. As bottom plate 24 rotates and moves upward (due to aperture 71), the overall height of splashguard 20 is effectively shortened.

It can be realized that certain embodiments of the present invention provide a splashguard that is able to adjust its height relative to changing road levels thereby allowing the splashguard to handle any potentially damaging impact it may receive when it comes in contact with the road. It can further be realized that in situations when a vehicle pulls forward or backs up on surface that provides low ground clearance, certain embodiments of the present invention provide a vehicle splashguard that is less likely to be damaged or deformed than conventional splashguards. Thus, certain embodiments of the present invention provide both a splashguard that is less susceptible to being damaged and a splashguard that substantially covers the area between the road and the vehicle bumper thereby preventing tire splashes from reaching a portion of the vehicle or following vehicles.

Figure 9:
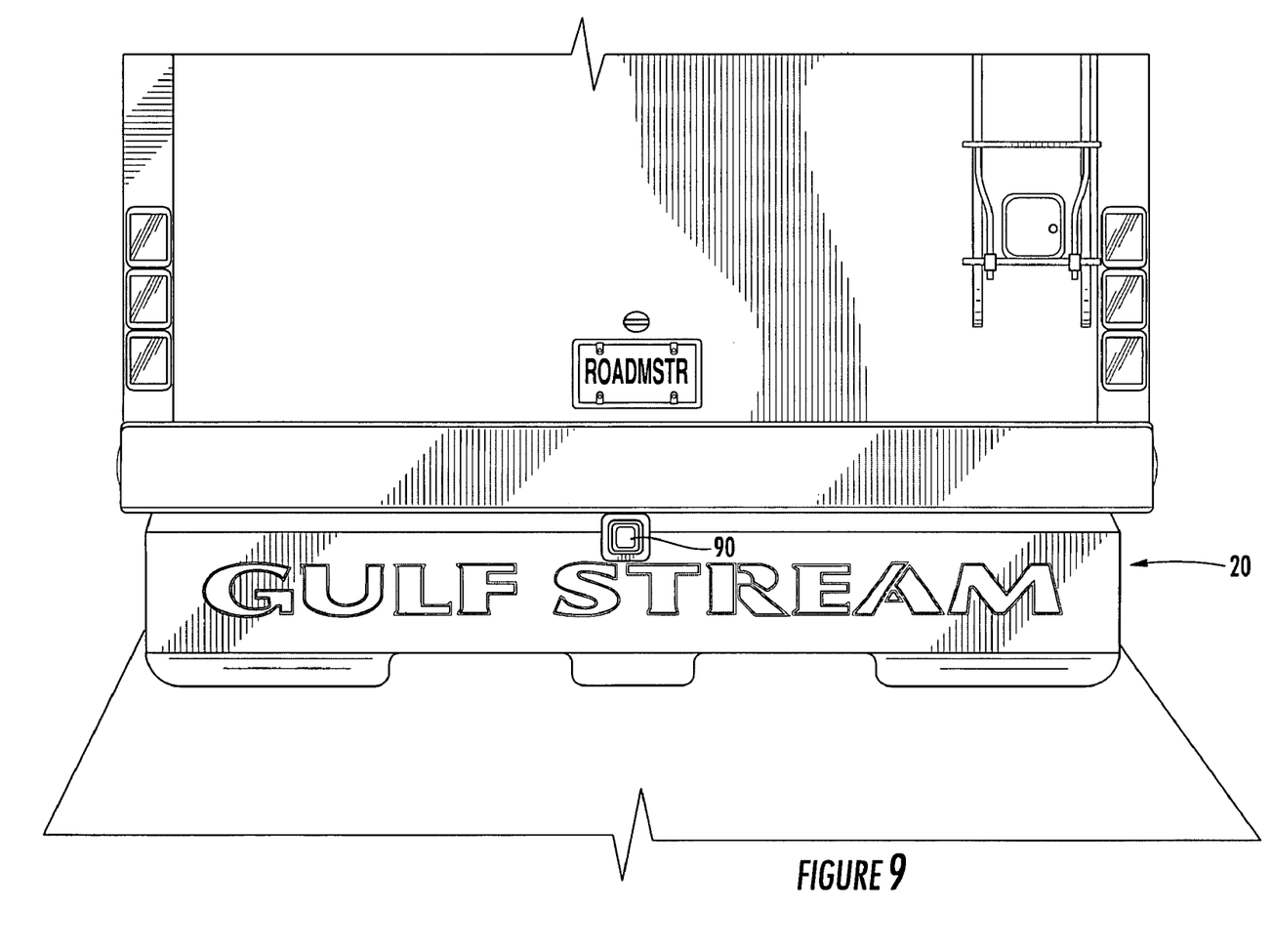
FIGS. 9-10 are substantially front views of various embodiments of the splashguard of the present invention, which are typically for diesel-fueled recreational vehicles.
Figure 10:
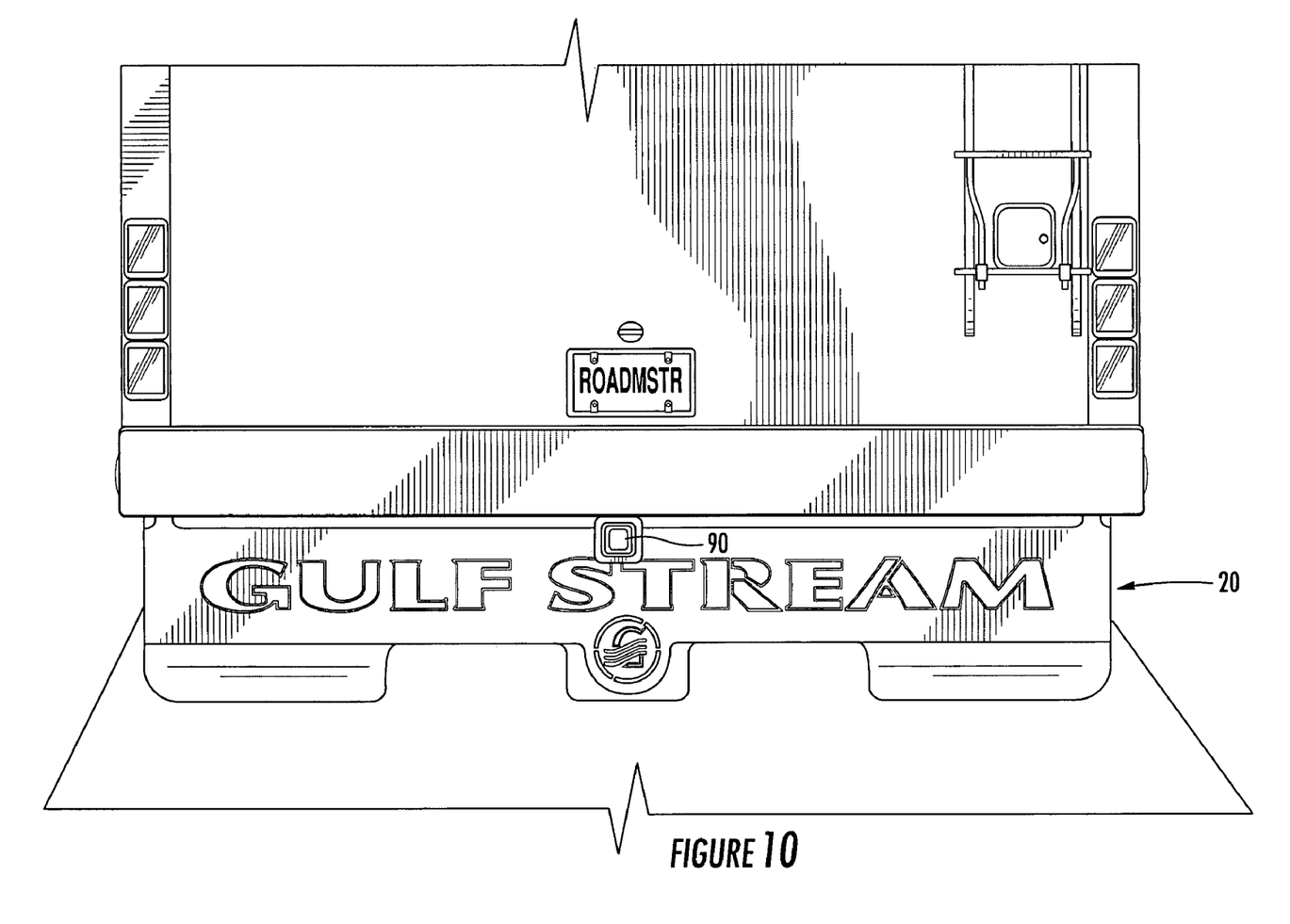

FIGS. 9 and 10 show an embodiment of splashguard 20 typically suited for conventional diesel-fueled recreational vehicles. Conventional diesel-fueled vehicles have splashguard undercarriage attachment points (not shown) in front of attachment points for trailer hitch assemblies (not shown), and thus allow splashguards 20 to be mounted in front of trailer hitch assemblies or adjacent to the openings of the trail hitch receivers 90.

Figure 11:
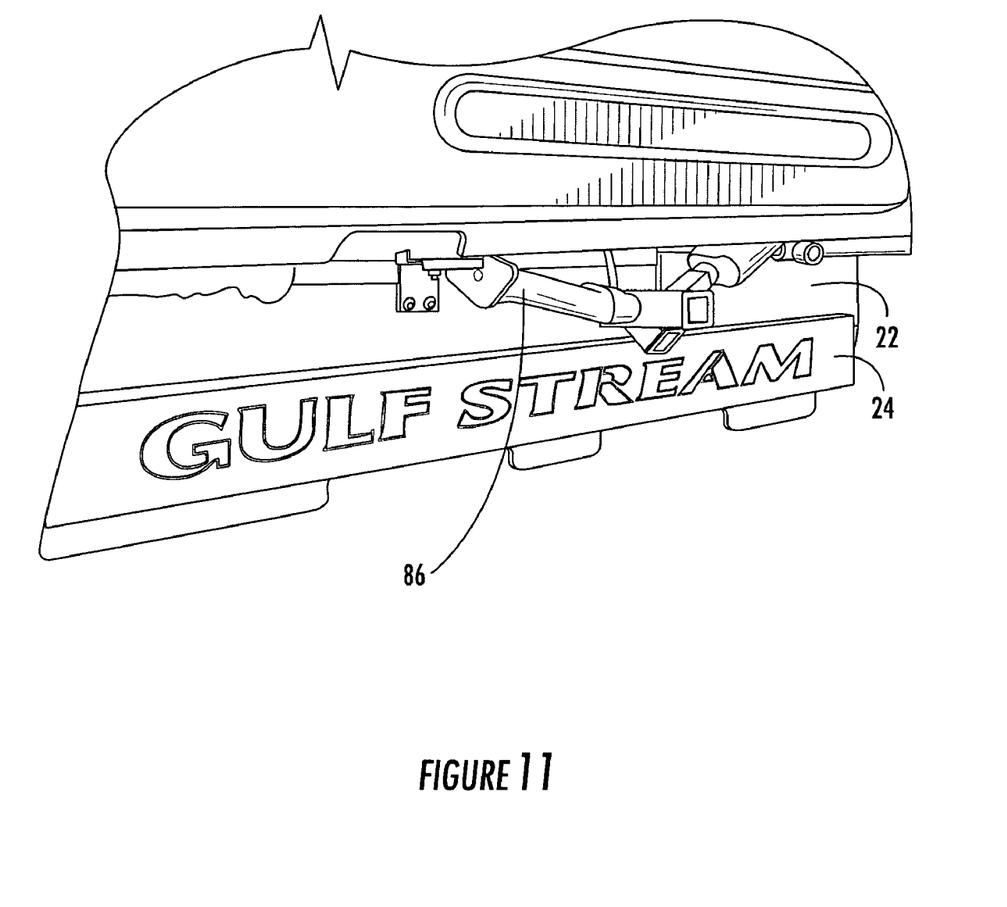
FIG. 11 is substantially a perspective view of another embodiment of the splashguard of the present invention, which is typically for gasoline-fueled recreational vehicles.

Referring now to FIG. 11, an embodiment of splashguard 20 typically suited for conventional gasoline-fueled recreational vehicles is shown. Conventional gasoline-fueled recreational vehicles typically have splashguard undercarriage attachment points behind the attachment points for trailer hitch assemblies 86. Due to this, splashguards 20 cannot be mounted in front of trailer hitch assemblies 86. It is noted that the vehicles shown in FIGS. 9, 10, and 11 are conventional recreational vehicles. These vehicles can of course be modified to allow splashguards 20 to be mounted in a desired location relative to vehicle 26. It is further noted that splashguards 20 are not limited for use with recreational vehicles. Splashguards 20 may be used with a variety of vehicles, including motorized vehicles, such as sport-utility vehicles, sedans, limousines, trucks, non-motorized vehicles, such as bicycles and trailers, commercial vehicles, non-commercial vehicles, vehicles designed for transporting passengers, vehicles designed for carrying loads, and other vehicles known in the art.

It can thus be realized that the certain embodiments of the present invention have better ability to control tire splashes than conventional splashguards. Certain embodiments also have the ability to substantially cover the area between the vehicle's bumper and the road. Certain embodiments are able to substantially cover the area between the vehicle's bumper and the road, while at the same time, being able to adjust the area being covered depending on the road level. Certain embodiments also provide a durable and aesthetically appealing splashguard. Certain embodiments further provide the ability to allow users to customize their splashguard, and certain embodiments of the present invention provide a splashguard for use with various vehicle engine types.

Although the description above contains many specifications, these should not be construed as limiting the scope of the invention but as merely providing illustrations of some embodiments of this invention. Thus, the scope of the invention should be determined by the appended claims and their legal equivalents rather than by the examples given.

What is claimed is:

1. A splashguard for use in controlling vehicle tire splashes, the splashguard comprising:
   (A) a first plate being attachable to a vehicle, the first plate being substantially as wide as the distance between the vehicle's rear tires, the first plate being configured to substantially control tire splashes from a vehicle tire;
   (B) a second plate attached to the first plate wherein an adjustably-spaced aperture is formed between the first plate and the second plate; and
   (C) at least one fastening mechanism configured to hingably attach the second plate to the first plate, the fastening mechanism comprising:
      (a) a strap attached to the second plate; and
      (b) a hanger attached to the first plate, the hanger being shaped to receive the strap, the hanger being configured to carry the strap and to suspend the second plate, the strap being moveably attached to the hanger, the attachment of the hanger to the first plate providing a gap between the hanger and the first plate, wherein when a surface being traveled on by the vehicle changes surface level, the gap accommodates translational motion of the strap to adjust height of the splashguard.

2. The splashguard of claim 1 further comprising at least one brace member attached to the first plate, the brace member being configured to support to the first plate.

3. The splashguard of claim 1 further comprising a first removable plate portion defined by the first plate, the first removable plate portion being shaped to create an opening for a vehicle component protruding from the rear side of the vehicle.

4. The splashguard of claim 3 further comprising a second removable plate portion defined by the first plate, the second removable plate portion being shaped to create an opening for a vehicle component protruding from the rear side of the vehicle.

5. A splashguard for use in controlling vehicle tire splashes, the splashguard comprising:
   (A) a first plate means for controlling tire splashes from a vehicle tire, the first plate means being attachable to the vehicle;
   (B) a second plate means for controlling tire splashes from a vehicle tire wherein an adjustably-spaced aperture is formed between the first plate means and the second plate means;
   (C) an attachment means for hingably attaching the second plate means to the first plate means, the first plate means and the second plate means forming the height of the splashguard, wherein the attachment means allows the second plate means to be suspended from the first plate means and to shorten the effective height of the splashguard according to a road level; and
   (D) wherein the attachment means comprises:
      (a) a strap configured to be attached to the second plate means; and
      (b) a hanger configured to be attached to the first plate means, the hanger being shaped to receive the strap, the hanger being configured to carry the strap and to suspend the second plate means, the strap being moveably attached to the hanger, the attachment of the hanger to the first plate providing a gap between the hanger and the first plate, the effective height of the splashguard being shortened by movement of the strap into the gap.

6. The splashguard of claim 5 wherein the first plate means and the second plate means are substantially as wide as the distance between the vehicle's rear tires.

7. The splashguard of claim 5 further comprising a means for structurally reinforcing the first plate means.

8. The splashguard of claim 5 wherein the first plate means comprises a means for accommodating a vehicle component protruding from a rear side of the vehicle.

9. The splashguard of claim 5 wherein the second plate means comprises a means for accommodating a vehicle component protruding from a rear side of the vehicle.

10. A splashguard for use in controlling tire splashes of a vehicle, the splashguard comprising:
 (A) a first plate attachable to a vehicle, the first plate being configured to substantially control tire splashes from the vehicle's tire;
 (B) a second plate hingably attached to the first plate, wherein when a surface being traveled on by the vehicle changes surface level, the second plate pivots relative to the first plate to adjust height of the splashguard; and
 (C) at least one fastening mechanism connected between the second plate and the first plate, the fasting mechanism comprising:
  (a) a first element connected to one of the first plate and the second plate;
  (b) a second element connected to the other of the first plate and the second plate; and
  (c) a gap between the first element and the plate to which the first element is attached;
  (d) wherein the fastening mechanism (i) hingably attaches the second plate to the first plate forming an adjustably-spaced aperture between the first plate and the second plate, and (ii) allows translational and rotational motion between the first and second plates, wherein translational motion is provided by extending the second element into the gap.

11. The splashguard of claim 10 wherein the first plate and the second plate are substantially as wide as the distance between the vehicle's rear tires.

12. The splashguard of claim 10 wherein:
 (A) the second element comprises a strap; and
 (B) the first element comprises a hanger, the hanger being shaped to receive the strap, the hanger being configured to carry the strap, the strap being moveably attached to the hanger.

13. The splashguard of claim 10 wherein the first plate defines at least one removable first plate portion, the removable first plate portion being configured to accommodate at least one vehicle component protruding from the rear side of the vehicle.

* * * * *